US007732230B2

(12) United States Patent
Yamamoto

(10) Patent No.: US 7,732,230 B2
(45) Date of Patent: Jun. 8, 2010

(54) BACKLIGHT INCLUDING DOT LIGHT EMITTING DEVICES HAVING AT LEAST TWO DIFFERENT BRIGHTNESS RANKS AND METHOD FOR MANUFACTURING SAME

(75) Inventor: Yoshihiko Yamamoto, Mihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/510,307

(22) Filed: Aug. 25, 2006

(65) Prior Publication Data
US 2007/0047257 A1 Mar. 1, 2007

(30) Foreign Application Priority Data
Aug. 31, 2005 (JP) .............................. 2005-252733

(51) Int. Cl.
H01L 21/00 (2006.01)
G09G 3/36 (2006.01)
(52) U.S. Cl. ......................................... 438/22; 345/102
(58) Field of Classification Search .................. 362/97, 362/249, 252, 228, 613, 238, 240, 611–64, 362/26, 27, 29, 30, 555, 561, 231, 125, 33, 362/800, 631, 294, 218, 345; 349/61, 68, 349/69, 70, 58, 60, 65; 438/22; 345/102
See application file for complete search history.

(56) References Cited
U.S. PATENT DOCUMENTS
4,926,546 A * 5/1990 Polczynski et al. ............ 29/840
2003/0107688 A1 6/2003 Yamagishi

| 2004/0113869 | A1* | 6/2004 | Kato et al. ................... 345/46 |
| 2005/0073495 | A1* | 4/2005 | Harbers et al. .............. 345/102 |
| 2005/0099806 | A1* | 5/2005 | Tsai ............................ 362/218 |
| 2006/0002143 | A1* | 1/2006 | Gu et al. ..................... 362/612 |
| 2006/0012989 | A1* | 1/2006 | Lee ............................. 362/231 |

FOREIGN PATENT DOCUMENTS

| JP | 10-105082 A | | 4/1998 |
| JP | 10105082 A | * | 4/1998 |
| JP | 2002-196688 A | | 7/2002 |
| JP | 2002-196702 A | | 7/2002 |
| JP | 2004-139876 A | | 5/2004 |
| JP | 2004139876 A | * | 5/2004 |

OTHER PUBLICATIONS

English Translation of Japanese Publication JP 2004139876 A.*
English Translation of Japanese Publication JP 10105082 A.*

* cited by examiner

Primary Examiner—W. David Coleman
(74) Attorney, Agent, or Firm—Morrison & Foerster LLP

(57) ABSTRACT

The present invention provides a method for manufacturing a backlight including a plurality of LEDs arranged in a plane manner. The method includes: preparing LEDs which are classified into a plurality of ranks in accordance with brightness; mounting, in respective blocks each having a same number of points for mounting LEDs, LEDs which are at least two different-ranked; and causing combinations of ranks of the LEDs in the respective blocks to conform to each other. Alternatively, the LEDs, classified into ranks each having a known center value of brightness, are mounted in the blocks such that a total of the center values of the respective ranks in each of the blocks becomes substantially uniform. This realizes a backlight having a uniform in-plane brightness distribution with a merit of cost.

11 Claims, 14 Drawing Sheets

FIG. 7

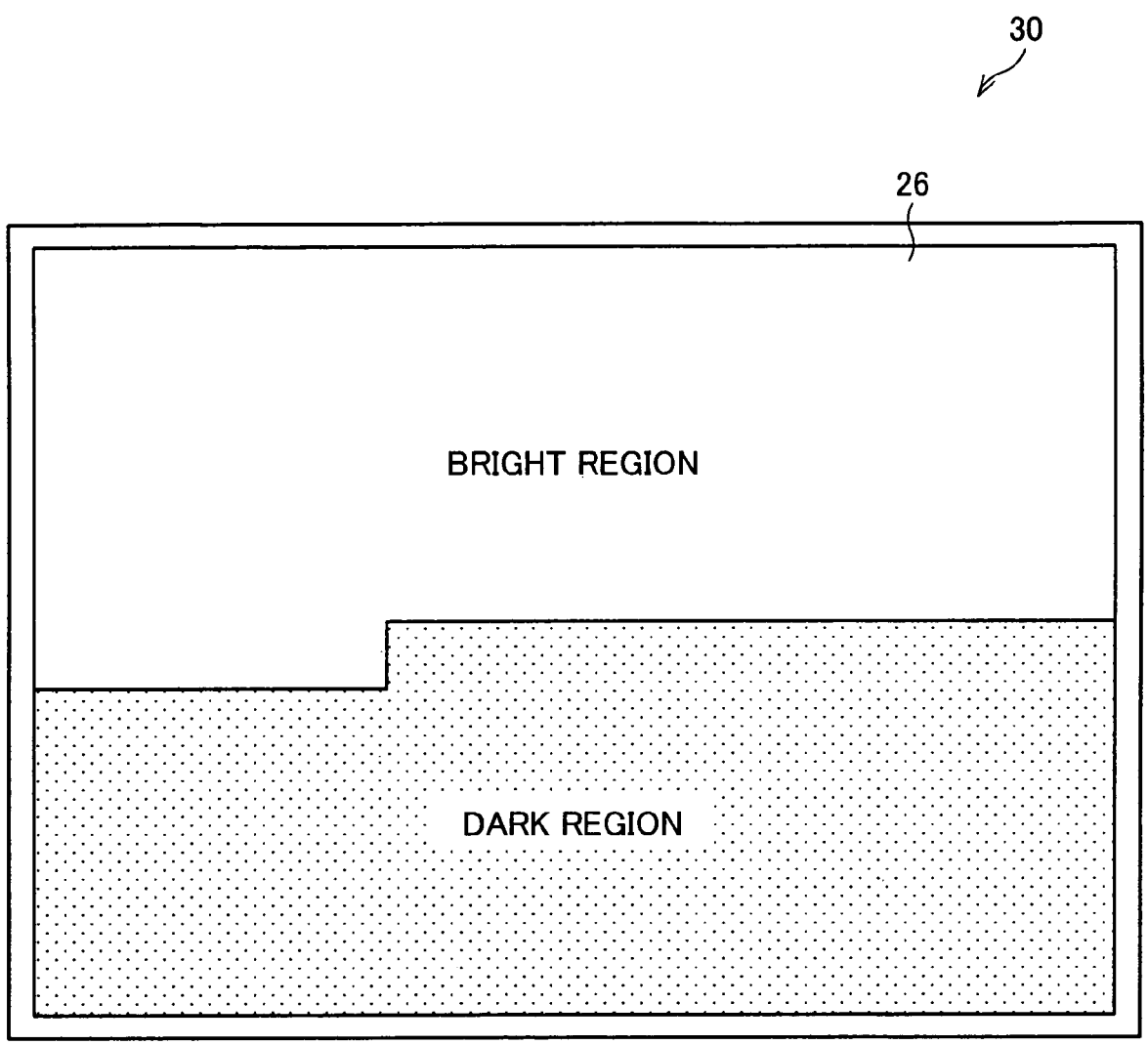

BACKLIGHT INCLUDING DOT LIGHT EMITTING DEVICES HAVING AT LEAST TWO DIFFERENT BRIGHTNESS RANKS AND METHOD FOR MANUFACTURING SAME

REFERENCE TO RELATED APPLICATIONS

This application claims priority under 35 U.S.C. Section 119(a) from Japanese Patent Application No. 252733/2005, filed Aug. 31, 2005, the entire contents of which are hereby incorporated by reference.

FIELD OF THE INVENTION

The present invention relates to (i) a method for manufacturing a backlight, used as a light source for a liquid crystal display panel for example, which is required to have a uniform in-plane brightness distribution on its light emitting surface, and (ii) a backlight manufactured by the method.

BACKGROUND OF THE INVENTION

A backlight is used as a light source for displaying an image on a liquid crystal display panel (hereinafter referred to as LCD panel), such as a liquid crystal television, a liquid crystal display, a liquid crystal monitor, or the like. In order to supply light over the entire LCD panel, a backlight is required to have a uniform in-plane brightness distribution.

Such a backlight employs fluorescent lamps such as cold cathode fluorescent lamps (hereinafter referred to as CCFL devices), or LEDs.

LEDs are classified into a plurality of ranks regarding varied brightnesses (brightness ranks). Even LEDs classified into the same brightness rank are allowed to have variations in brightness in the range of predetermined values (brightness variations). Thus, when a backlight employing LEDs is manufactured, it is necessary to consider such variations in brightness among LEDs to be prepared so that a uniform in-plane brightness distribution can be maintained.

It should be noted that, in a backlight, an in-plane brightness distribution is absorbed to some extent because illuminating light is generally viewed through a diffusion sheet and an LCD panel. This eliminates the need to consider such variations in brightness of the same brightness rank, in the case of a backlight.

A Japanese Unexamined Patent Publication No. 105082/1998 (Tokukaihei 10-105082, publication date: Apr. 24, 1998) discloses a method for preparing LEDs having brightnesses being varied in the same brightness rank, and mounting the LEDs on the substrate so that a uniform brightness is viewed. This publication describes an LED dot matrix panel for displaying arbitrary characters and/or figures, not a backlight in which light is viewed through a diffusion sheet in the foregoing manner. Thus, even variations in brightness of the same brightness rank is considered in this publication.

As described above, in a backlight, an in-plane brightness distribution is absorbed to some extent because illuminating light passes through a diffusion sheet and an LCD panel. This eliminates the need to consider variations in brightness of the same brightness rank, unlike the case of the LED dot matrix panel described in the above publication.

That is, variations in brightness would not be a big issue if a backlight is manufactured by employing LEDs of the same brightness rank. However, manufacturing all backlights employing LEDs of the same brightness rank would cause a cost increase due to the following reasons.

For example, assume that 250 LEDs are mounted on each substrate constituting a backlight and 50,000 backlights are manufactured per month. In this case, 12,500,000 LEDs are required every month. With actual capability of manufacturing LEDs, however, it is difficult to manufacture 12,500,000 LEDs of only the same rank due to variations caused during manufacturing, even if it would be possible to manufacture 12,500,000 LEDs of plural brightness ranks. Further, if LEDs of only one brightness rank are manufactured, eventually, LEDs have to be discarded which have a brightness not falling within a desired rank. This causes a high increase in cost for purchasing and preparing only LEDs of the same brightness rank.

SUMMARY OF THE INVENTION

The present invention is made in view of the foregoing problems, and an object of the invention is to provide a backlight having a uniform in-plane brightness distribution with a merit of cost.

According to the present invention, to solve the foregoing problems, there is provided a method for manufacturing a backlight including a plurality of dot light emitting devices arranged in a plane manner, preparing dot light emitting devices which are classified into a plurality of ranks in accordance with brightness, mounting, in respective blocks each having a same number of points for mounting dot light emitting devices, dot light emitting devices which are at least two different-ranked, and causing combinations of ranks of the dot light emitting devices in the respective blocks to conform to each other.

Further, according to the present invention, there is provided a method for manufacturing a backlight including a plurality of dot light emitting devices arranged in a plane manner, preparing dot light mounting devices which are classified into a plurality of ranks in accordance with brightness, each of the ranks having a known center value of brightness, and mounting, in respective blocks each having a same number of points for mounting dot light emitting devices, dot light emitting devices which are at least two different-ranked, and causing a total of center values of brightness in each of the blocks to become substantially uniform.

According to the method, dot light emitting devices are prepared which are classified into a plurality of the brightness ranks in accordance with brightness, and dot light emitting devices, classified into at least different-ranked, are mounted in the respective blocks each having the same number of points for mounting the dot light emitting devices.

This eliminates the need to prepare a number of dot light emitting devices of the same rank, enabling to avoid a cost increase caused by preparing a number of dot light emitting devices of the same rank.

Further, according to the method, it is possible (i) to cause combinations of ranks of the dot light emitting device, mounted in the respective blocks, to conform to each other or (ii) to cause a total of center values of brightness of the dot light emitting devices, mounted in each of the blocks, to become substantially uniform.

Note that, causing a total of center values to become substantially uniform means that a total of the center values in each of the blocks varies within the range of ±15%.

This allows the blocks to have a substantially uniform brightness, so that surfaces illuminated by dot light emitting devices mounted in the blocks have a substantially uniform brightness. This realizes manufacturing of a backlight having a highly uniform in-plane brightness distribution.

As described above, in the method for manufacturing a backlight according to the present invention, it is possible to achieve such advantages as (i) avoiding a cost increase caused by preparing a number of devices of the same rank and (ii) manufacturing a backlight having a sufficiently uniform in-plane brightness distribution.

Further, a backlight of the present invention includes: a plurality of linear light emitting devices mutually arranged in parallel; a plurality of dot light emitting devices disposed in gaps between the linear light emitting devices; and a substrate from which a part having a same shape as the linear light emitting devices is cut out, the dot light emitting devices being mounted on a part of the substrate other than the part thus cut out, the linear light emitting devices being provided in the part thus cut out.

According to the arrangement, the backlight of the present invention includes the linear light emitting devices and the dot light emitting devices. Further, the dot light emitting devices are mounted on the portion of the substrate other than the part thus cut out, and the linear light emitting devices are provided in the part thus cut out.

The linear light emitting devices are constituted by thin glass tubes and may be broken due to vibration, which occurs when the linear light emitting devices are mounted directly on a substrate. Considering this, the linear light emitting devices are mounted so as to be held with a predetermined distance from the substrate.

This creates, when the dot light emitting devices and the linear light emitting devices are mounted on the substrate, a large distance between the surfaces of the respective light emitting devices.

Thus, the backlight of the present invention is arranged such that only the dot light emitting devices are mounted on the substrate.

Since the linear light emitting devices are disposed close to light emitting surfaces of the dot light emitting devices mounted on the substrate, the backlight can have a reduced thickness. This allows an object illuminated by the backlight to be disposed close to a light source, thereby improving the efficiency of using light from the dot light emitting devices and the linear light emitting devices.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is a view showing LED mounting points in a case where two tooth-shaped substrates are prepared from a single substrate.

FIG. 15 is a view showing brightness variations appearing on an LCD panel illuminated by the backlight in the liquid crystal display of FIG. 14.

DETAILED DESCRIPTION OF THE INVENTION

As described in the foregoing, manufacturing a backlight employing only LEDs (dot light emitting devices) of the same brightness rank causes a cost increase. It is therefore necessary to prepare LEDs of different brightness ranks for manufacturing a backlight.

Referring to FIGS. 12 through 15, the following will describe a method for manufacturing a backlight employing LEDs of different brightness ranks by way of example.

Figure 12:
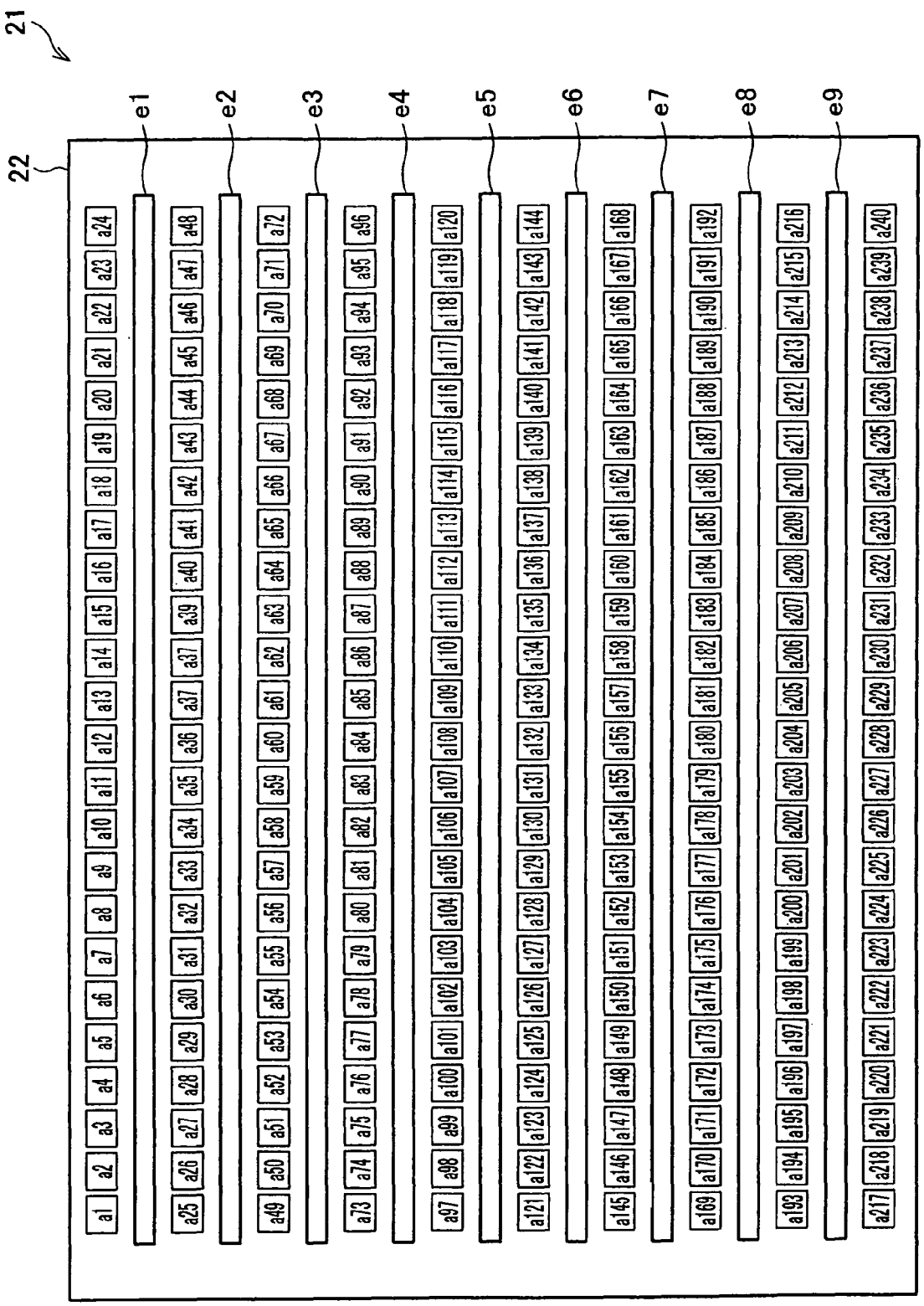
FIG. 12 is a plan view illustrating a backlight including LEDs and straight-tube CCFL devices, wherein points for mounting the LEDs and the CCFL devices are indicated.

FIG. 12 is a plan view illustrating a backlight 21 including LEDs and straight-tube CCFL devices (linear light emitting devices), wherein mounting points for mounting the LEDs and the CCFL devices are indicated.

In the backlight 21, linearly arranged LED mounting points a1 through a240 and straight-tube CCFF mounting points e1 through e9 are provided alternately. The LED mounting points a1 through a240 serve to mount the LEDs on a substrate 22, and the CCFL device mounting points e1 through e9 serve to mount the CCFL devices.

Specifically, the LED mounting points a1 through a240 are configured to have 10 rows each having 24 LED mounting points, such as a1 through a24, or a25 through a48. Following the LED mounting points a1 through a24, the CCFL device mounting point e1 and consequently the LED mounting points a25 through a48 are provided. As such, the LED mounting points and the CCFL device mounting points are provided alternately.

Figure 13:
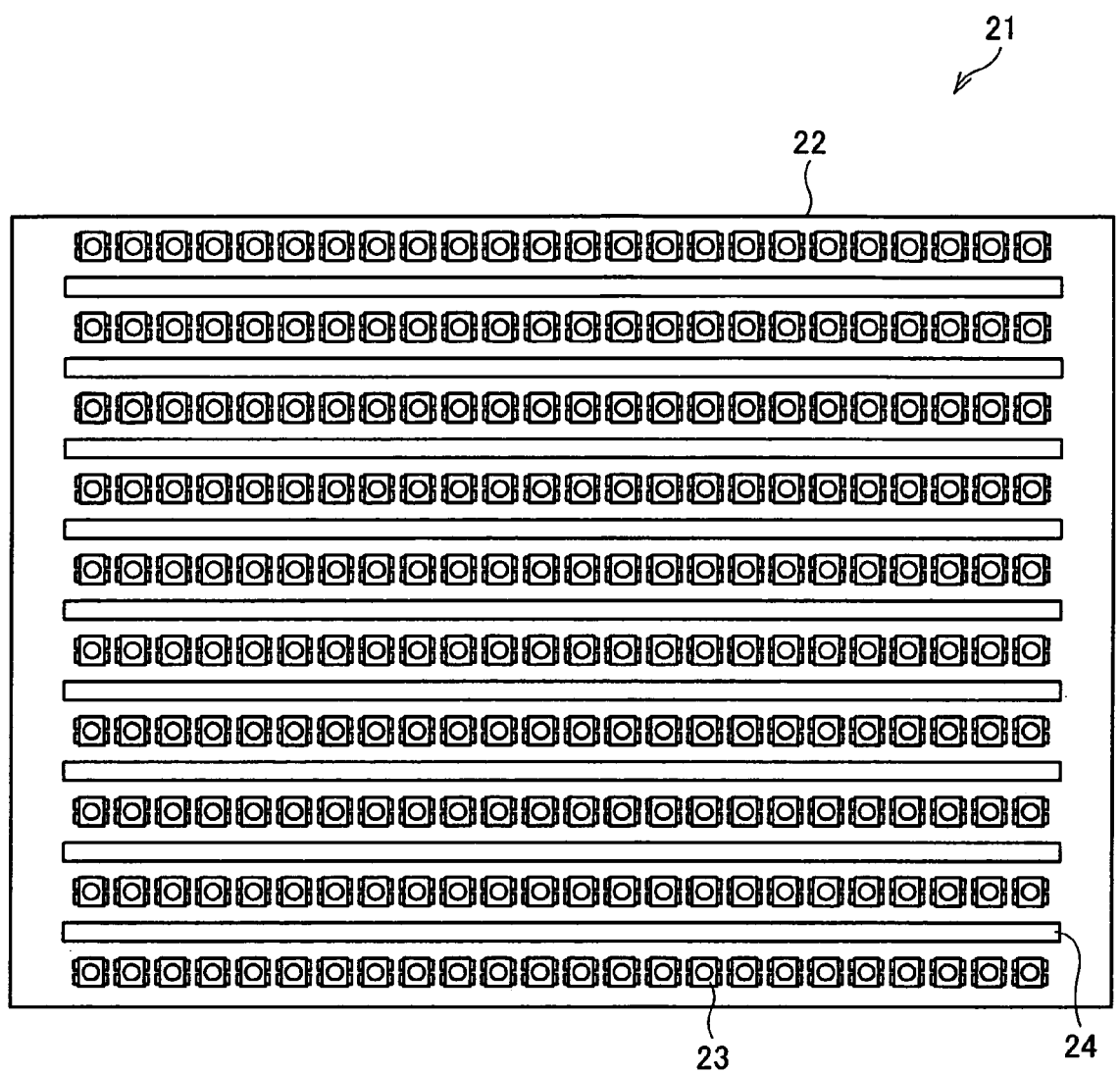
FIG. 13 is a plan view illustrating the backlight including LEDs and CCFL devices, which are mounted on the points indicated in FIG. 12.
Figure 14:
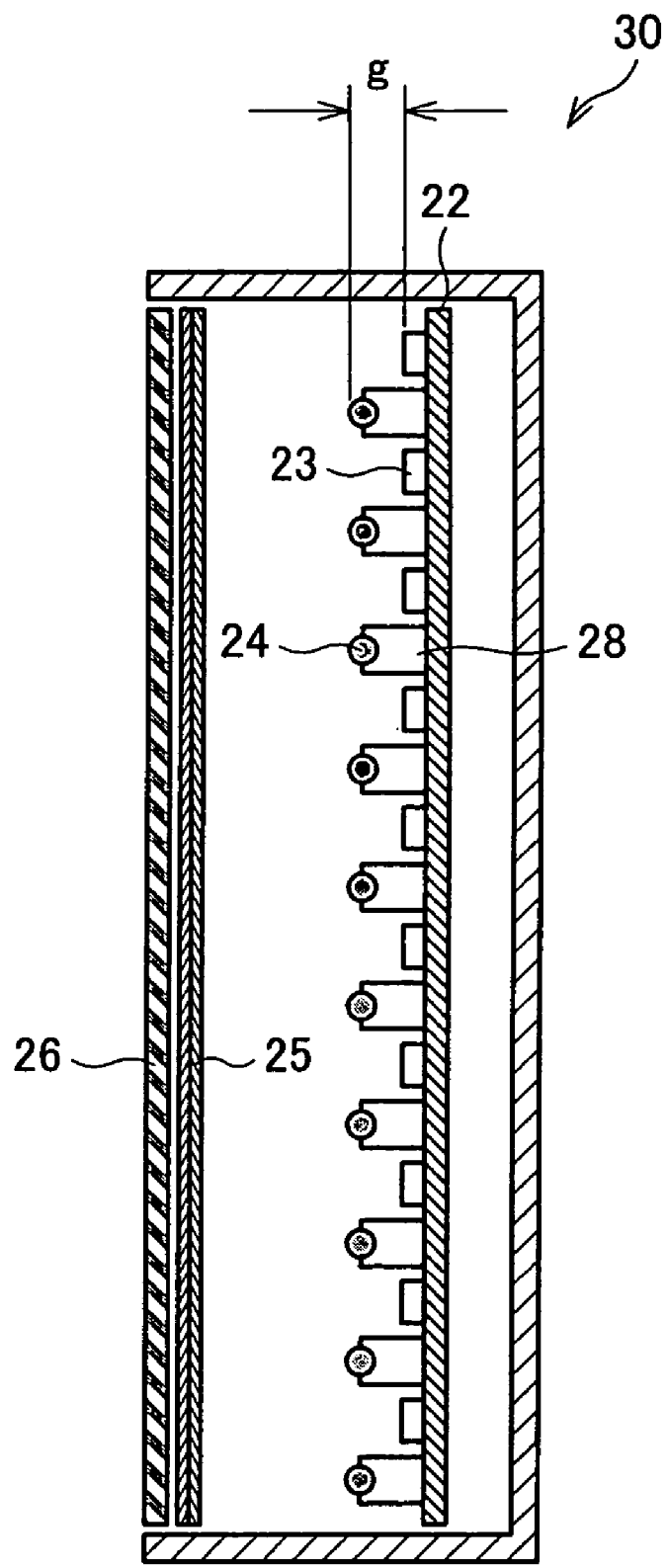
FIG. 14 is a cross-sectional view illustrating a structure of a liquid crystal display employing the backlight.

FIG. 13 is a plan view illustrating a backlight 21 in which LEDs 23 and CCFL devices 24 are mounted on the mounting points. FIG. 14 is a cross-sectional view illustrating a structure of a liquid crystal display 30 employing the backlight 21.

In the backlight 21 having thereon the LEDs 23 and the CCFL devices 24, the LEDs 23 are mounted on the LED mounting points a1 through a240 on the substrate 22, and the CCFL devices 24 are mounted on the CCFL device mounting points e1 through e9, as shown in FIG. 13.

As shown in FIG. 14, the CCFL devices 24 are provided on CCFL device mounting members 28 on the substrate 22.

The CCFL device mounting members 28 serve to hold the CCFL devices 24 at a predetermined height so that the CCFL devices 24 do not contact the substrate 22. This prevents breakage of the substrate 22 when the CCFL devices 24 contact the substrate 22.

Further, as shown in FIG. 14, the liquid crystal display 30 has a structure in which a diffusion sheet 25 and an LCD panel 26 are provided on an upper surface of the backlight 21 having the above structure.

In order to manufacture the backlight 21 employing LEDs of different brightness ranks, one possible method would be to mount LEDs 23 of different brightness ranks in series on the substrate 22. For example, first LEDs 23 of a high brightness rank are mounted on LEDs mounting points a1 through a125, and second LEDs 23 of a low brightness rank are mounted on LED mounting points a126 through a240.

FIG. 15 is a view showing brightness variations appearing on the LCD panel 26 illuminated by the backlight 21 in the liquid crystal display 30 of FIG. 14.

As described above, in the case where the LEDs 23 of the high brightness rank, i.e., the first brightness rank, are provided on the LED mounting points a1 through a125 while the LEDs 23 of the low brightness rank, i.e., the second brightness rank are mounted on the LED mounting points a126 through a240, varied brightnesses appear on the LCD panel 26 according to light illuminated by the LEDs of the first brightness rank and the LEDs of the second brightness rank. That is, the brightnesses of the light illuminating the LCD panel 26 substantially correspond to the LEDs 23 of the first brightness rank and the LEDs 23 of the second brightness rank, respectively.

Thus, the brightness of the light emitted from the LEDs 23 onto the LCD panel 26 becomes higher in a region corresponding to the LED mounting points a1 through a125 than in a region corresponding to the LED mounting points a126 through a240.

That is, arranging the LEDs 23 of different brightness ranks merely in order causes variations in brightness on the LCD panel 26.

In view of this, a method for manufacturing a backlight according to the present invention serves to provide, by preparing LEDs of different brightness ranks, a backlight having a uniform in-plane brightness distribution.

Referring to FIGS. 1 through 11, the following will describe one embodiment of the present invention.

Figure 1:
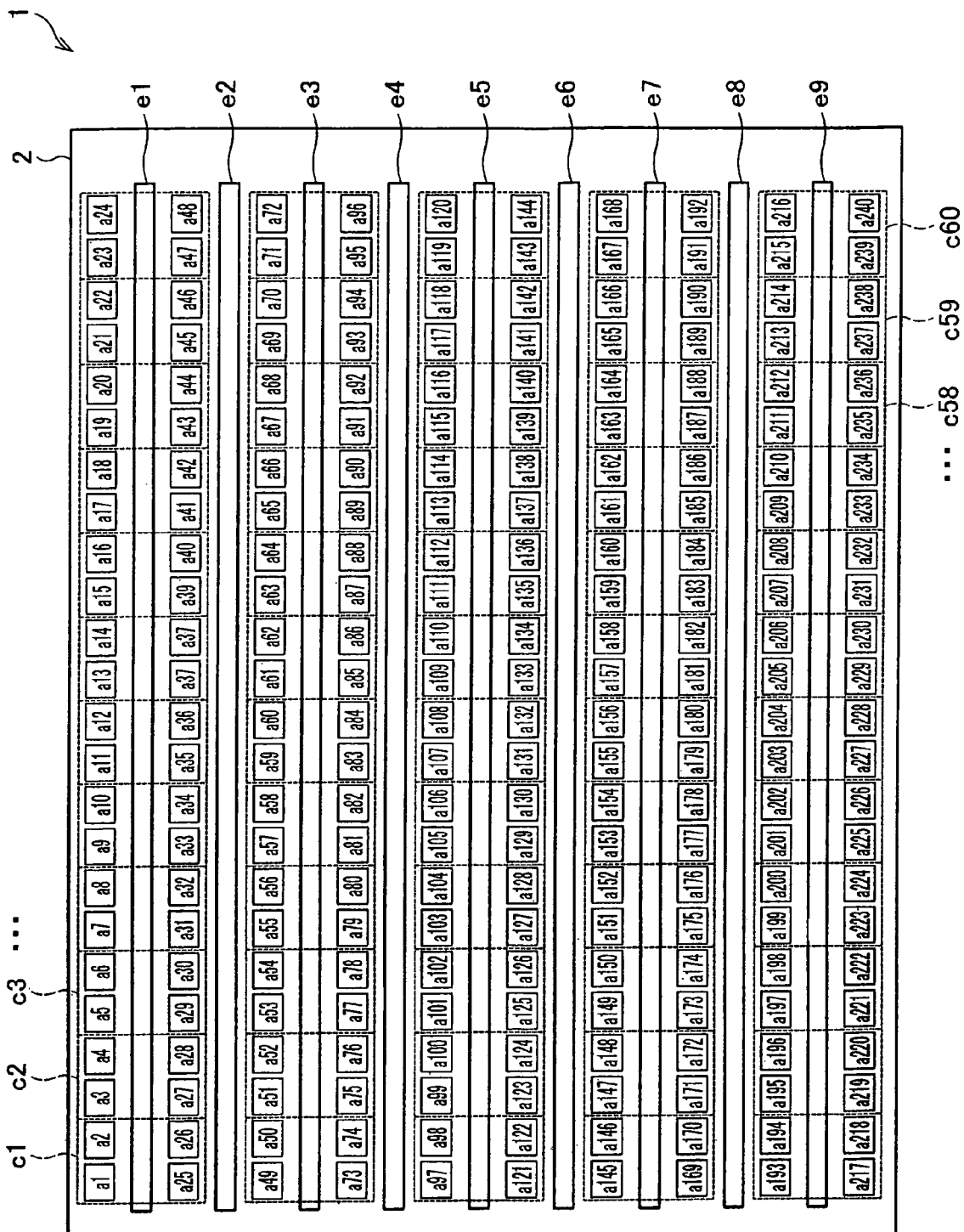
FIG. 1 is a plan view illustrating a substrate constituting a backlight according to a present embodiment.

FIG. 1 is a plan view illustrating a substrate 2 constituting a backlight 1 of the present embodiment.

Note that, the backlight of the present invention is preferably used in a liquid crystal display.

The backlight 1 of the present embodiment includes linearly arranged LED mounting points a1 through a240 and straight-tube CCFL device mounting points e1 through e9, which are provided alternately. The LED mounting points a1 through a240 serve to mount LEDs 3 on the substrate 2, and the CCFL device mounting points e1 through e9 serve to mount CCFL devices 4.

Specifically, the LED mounting points a1 through a240 are configured to have 10 rows, arranged in parallel, each of which has 24 LED mounting points such as a1 through a24. Following the LED mounting points a1 through a24, the CCFL device mounting point e1 and consequently the LED mounting points a25 through a48 are provided. As such, the LED mounting points and the CCFL device mounting points are provided alternately.

Note that, the mounting points in the backlight 1 of the present embodiment are the same as those shown in FIG. 12. The present embodiment is distinctive regarding a method of mounting the LEDs 3.

Referring to FIGS. 1 through 4, the following will describe the method of mounting the LEDs 3 on the LED mounting points a1 through a240.

In the present embodiment, as shown in FIG. 1, the LED mounting points a1 through a240 are divided into 60 blocks in total, i.e., c1 through c60. Each block is constituted by four LED mounting points of lateral 2 rows×longitudinal 2 columns, for example, such as a1, a2, a25, and a26.

Each of the blocks includes a predetermined number of LED mounting points provided adjacent to each other. The predetermined number may be any number that can divide the number of the LED mounting points a1 through a240. Further, each of the blocks has an identical shape.

Figure 2:
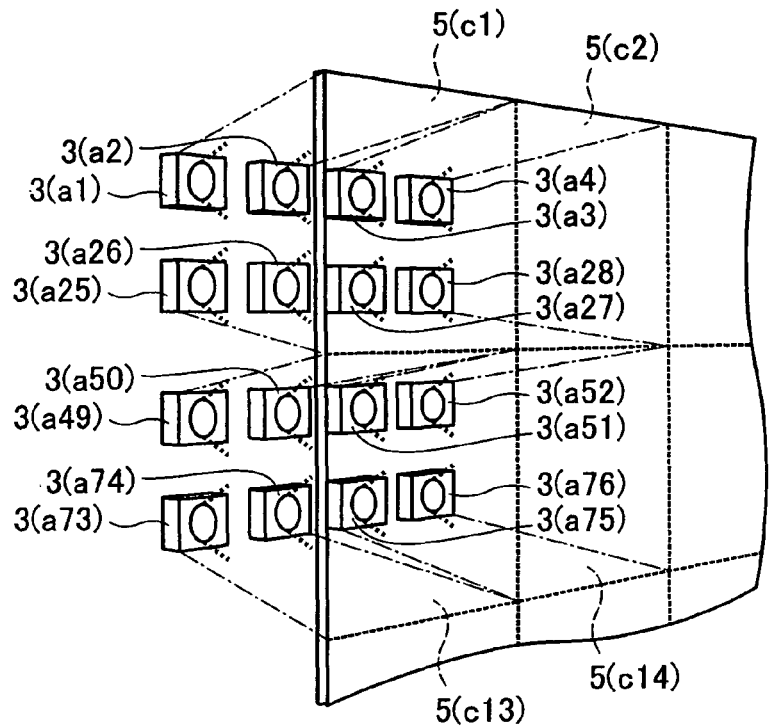
FIG. 2 is a perspective view illustrating groups of LEDs in blocks and how the groups relate to illuminated areas on an LCD panel illuminated by the LEDs.

FIG. 2 is a perspective view illustrating groups of the LEDs 3 in blocks and how the groups relate to illuminated areas 5 on an LCD panel 26 illuminated by the LEDs 3.

Referring to FIG. 2, the following will describe in detail how the blocks relate to the illuminated areas 5.

Four LEDs 3 constituting a block c1 illuminate an illuminated area 5 that corresponds to the block c1.

Further, four LEDs 3 constituting a block c2 illuminate an illuminated area 5 that corresponds to the block c2.

Further, four LEDs 3 constituting a block c13 illuminate an illuminated area 5 that corresponds to the block c13.

Further, four LEDs 3 constituting a block c14 illuminate an illuminated area 5 that corresponds to the block c14.

In FIG. 2, indicated by 3($a1$) is an LED 3 mounted on an LED mounting point a1, and 5($c1$) is an illuminated area 5 illuminated by a group of the LEDs 3 constituting the block c1.

Thus, a brightness of light illuminating an illuminated area 5 substantially corresponds to a total brightness of LEDs 3 constituting a block that corresponds to the illuminated area 5. Therefore, even when individual LEDs 3 constituting each block have different brightness ranks, as long as a total brightness of LEDs 3 as a group in each block is substantially uniform over all of the blocks, every illuminated area 5 corresponding to each block has a substantially uniform brightness.

In the present embodiment, the foregoing described the case where every block is constituted by four LEDs 3. However, the present invention is not limited to this example. Since the object of the present invention is to cause a total brightness of LEDs 3 in each block to become uniform, each block can be constituted by at least two LEDs 3.

However, in order to cause a total brightness of LEDs 3 in each block to become uniform over all of the blocks, brightness ranks of the respective LEDs 3 should be considered. Specifically, LEDs 3 employed to manufacture a backlight 21 commonly have brightnesses ranging from 3 to 5 ranks and it is required, in order to avoid a cost increase, to prepare LEDs 3 of more than one brightness ranks. Thus, a total brightness in each block needs to become uniform using such LEDs 3.

For this purpose, the number of LEDs 3 constituting every block needs to be defined according to the number of brightness ranks of the LEDs 3 to be used.

Considering these, it is most appropriate that the number of LEDs 3 constituting every block is four to six.

The following will describe a method of mounting LEDs 3 on the substrate 2 in a case where the LEDs 3 have four brightness ranks.

TABLE 1

| BRIGHTNESS RANK | 1 LED | 2 LEDs | 3 LEDs | 4 LEDs |
|---|---|---|---|---|
| A | 828 | 1656 | 2484 | 3312 |
| B | 1178 | 2356 | 3534 | 4712 |
| C | 1688 | 3376 | 4854 | 6752 |
| D | 2420 | 4840 | 7260 | 9680 | units of measurement in Table 1 are milicandelas or mcd)

Table 1 shows total brightnesses of one to maximum four LED(s) 3 in the case where the LEDs 3 have four brightness ranks A, B, C, and D (unit: mcd).

The following will describe the LEDs 3 of the brightness ranks A through D, starting from the ones having the lowest brightness rank.

In Rank A, a single LED has a brightness of 828 (mcd), two LEDs have a brightness of 1656 (mcd), three LEDs have a brightness of 2484 (mcd), and four LEDs have a brightness of 3312 (mcd).

In Rank B, a single LED has a brightness of 1178 (mcd), two LEDs have a brightness of 2356 (mcd), three LEDs have a brightness of 3534 (mcd), and four LEDs have a brightness of 4712 (mcd).

In Rank C, a single LED has a brightness of 1688 (mcd), two LEDs have a brightness of 3376 (mcd), three LEDs have a brightness of 4854 (mcd), and four LEDs have a brightness of 6752 (mcd).

In Rank D, a single LED has a brightness of 2420 (mcd), two LEDs have a brightness of 4840 (mcd), three LEDs have a brightness of 7260 (mcd), and four LEDs have a brightness of 9680 (mcd).

The LEDs 3 of the respective brightness ranks have variations in brightness, so called brightness ranks, and Table 1 shows center values of the respective brightness rank.

According to Table 1, in a case where four LEDs 3 of the lowest brightness Rank A are mounted in a block, an illuminated area 5 that corresponds to the block illuminated by the four LEDs 3 has a total brightness of 3312 (mcd). Further, in a case where four LEDs 3 of the highest brightness Rank D are mounted in a block, an illuminated area 5 that corresponds to the block illuminated by the four LEDs 3 has a total brightness of 9680 (mcd). That is, the result of comparison between the block employing the LEDs 3 of only Rank A and the block employing the LEDs 3 of only Rank D finds that a variation in brightness of the LEDs 3 between the blocks becomes about three times.

Figure 3:
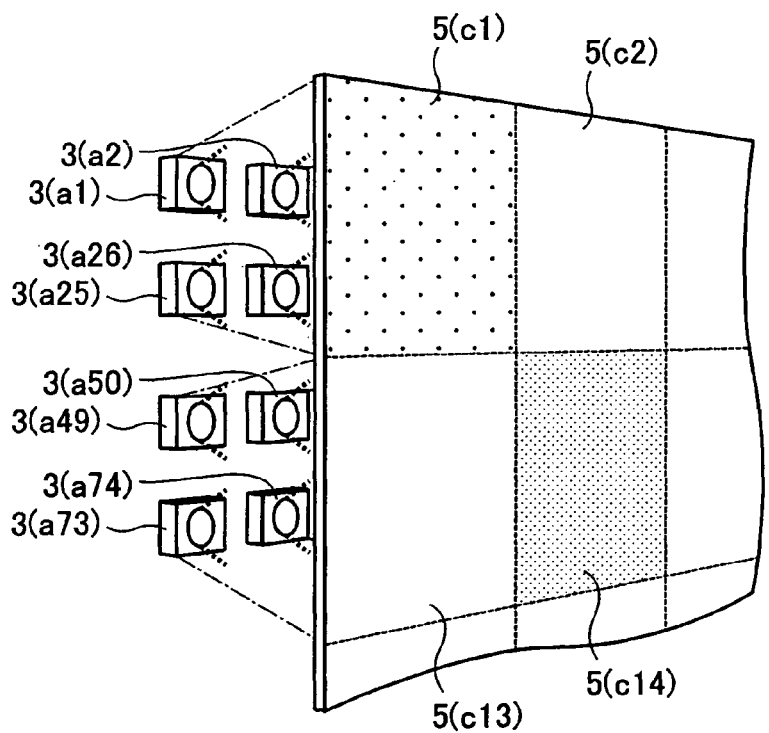
FIG. 3 is a perspective view showing that illuminated areas have varied brightnesses among blocks.
Figure 4:
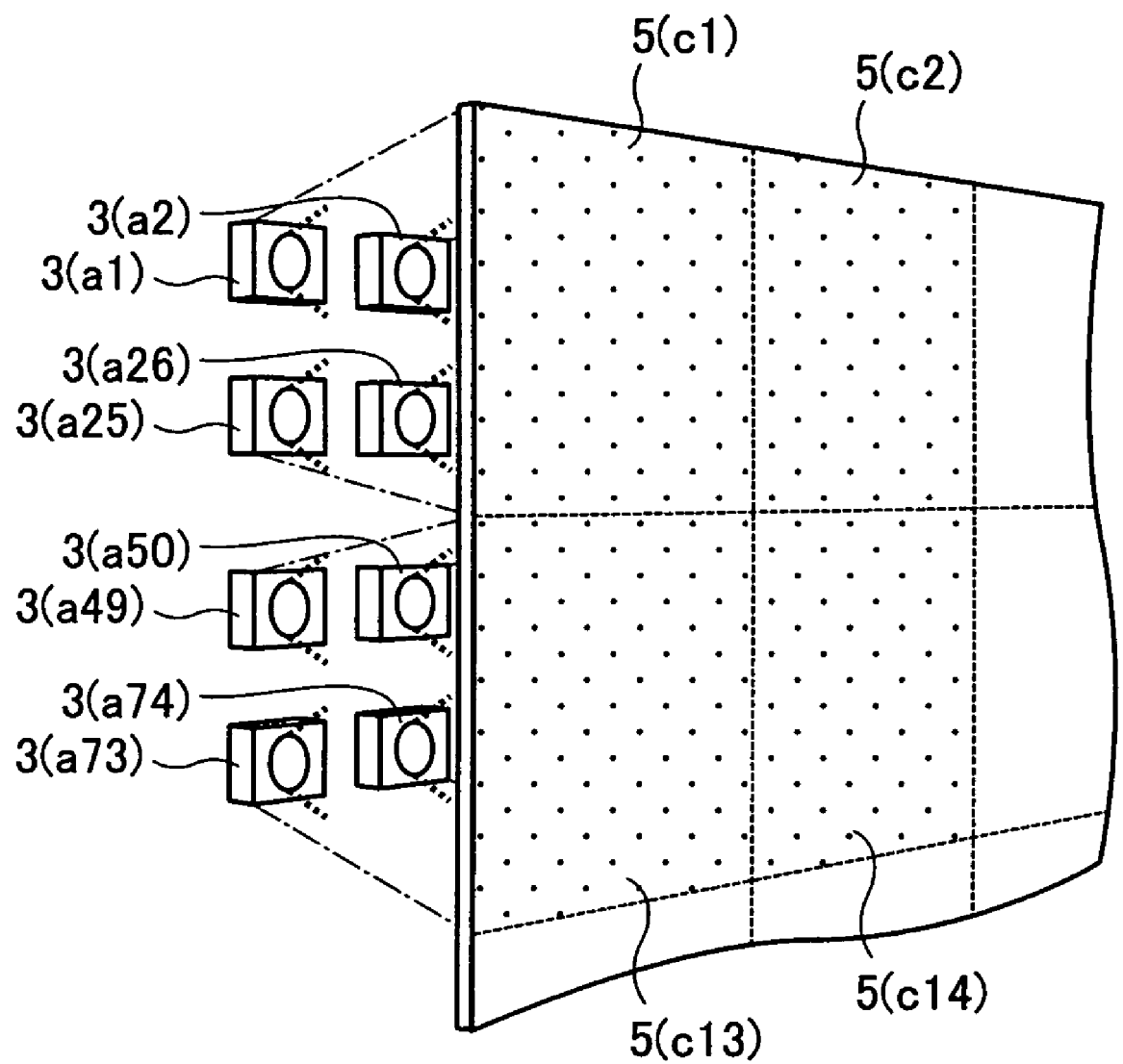
FIG. 4 is a perspective view showing that illuminated areas have a uniform brightness among blocks.

FIG. 3 is a perspective view showing that illuminated areas 5 have varied brightnesses among blocks, and FIG. 4 is a perspective view showing that illuminated areas 5 have a uniform brightness among blocks.

As described above, when there are variations among blocks with regard to a total brightness of four LEDs 3 constituting each block, brightness variations appear over illuminated areas 5 illuminated by corresponding four LEDs 3.

For example, when a total brightness of four LEDs 3 is varied in each of the blocks c1, c2, c13, and c14, accordingly, brightness variations appear over illuminated areas 5 that correspond to the blocks.

In order to employ LEDs 3 of the four brightness ranks and suppress such variations in brightness among the blocks, the LEDs 3 constituting the blocks are arranged such that LEDs 3 of respective ranks, i.e., four LEDs 3 each being of Rank A, B, C, and D, are mounted on respective four LED device mounting points in each of the blocks. With regard to the block c1 for example, LEDs 3 each being of Rank A, B, C, and D are mounted on four LED mounting points a1, a2, a25, and a26, respectively. This causes a brightness in each illuminated area 5 to become uniform, as shown in FIG. 4.

As such, four LEDs 3 of Rank A, B, C, and D are mounted in every block, so that a total brightness of each illuminated area becomes substantially uniform over all of the blocks. This realizes a uniform brightness over the entire display surface.

In the present embodiment, LEDs 3 employed in every block have four brightness ranks of Rank A+Rank B+Rank C+Rank D. However, the combination of the brightness ranks may be altered according to the ratio of the brightness ranks of given LEDs 3. For example, when the ratio of LEDs 3 of Rank B is high, the brightness ranks may be constituted by Rank A+Rank B+Rank B+Rank C.

In such a manner, when a combination of the brightness ranks of LEDs 3 in a block is initially preset, the same combination may be applied in mounting all blocks. This enables the method for manufacturing a backlight according to the present invention to efficiently manufacture a backlight having a uniform in-plane brightness distribution.

Further, the brightness ranks of LEDs 3 disposed in every block are not limited to this example, and may be any ranks as long as a substantially uniform brightness is realized among blocks.

Specifically, it is not necessary to mount LEDs 3 having a combination of the same brightness rank in every block. Instead, LEDs 3 may be mounted on the substrate 2 such that a total of center values of the respective ranks (shown in Table 1) in each of the block becomes substantially uniform over all of the blocks.

Further, in order to manufacture all backlights of the same brightness rank, consideration should be given to not only variations in brightness in the substrate 2, but also variations in brightness among substrates. Such brightness variations (i) among blocks on a substrate and (ii) among substrates can be suppressed by mounting LEDs 3 on all the substrates with the method for manufacturing a backlight according to the present embodiment.

As described above, according to the present embodiment, a method for manufacturing a backlight includes a plurality of LEDs arranged in a plane manner, preparing LEDs 3 which are classified into a plurality of ranks in accordance with brightness, mounting, in respective blocks each having a same number of points for mounting LEDs 3, LEDs 3 which are at least two different-ranked, and causing combinations of ranks of the LEDs 3 in the respective blocks to conform to each other.

Further, according to the present invention, there is provided a method for manufacturing a backlight including a plurality of LEDs 3 arranged in a plane manner, preparing LEDs 3 which are classified into a plurality of ranks in accordance with brightness, each of the ranks having a known center value of brightness, and mounting, in respective blocks each having a same number of points for mounting LEDs 3, LEDs 3 which are at least two different-ranked, and causing a total of center values of brightness in each of the blocks to become substantially uniform.

According to the method, LEDs 3 are prepared which are classified into a plurality of ranks in accordance with brightness, and LEDs 3 classified into at least two different-ranked are mounted in the respective blocks each having the same number of points for mounting the LEDs 3.

This eliminates the need to employ a number of LEDs 3 of the same rank, enabling to avoid a cost increase caused by preparing a number of dot light emitting devices of the same rank.

Further, according to the method, it is possible (i) to cause combinations of ranks of the LEDs 3, mounted in the respective blocks, to conform to each other, or (ii) to cause a total of center values of brightness of LEDs 3, mounted in each of the blocks, to become substantially uniform.

Note that, causing a total of center values to become substantially uniform means that a total of the center values in each of the blocks varies within the of ±15%.

This allows the blocks to have a substantially uniform brightness, so that illuminated areas 5 illuminated by LEDs 3 mounted in the blocks have a substantially uniform brightness. This realizes manufacturing of a backlight having a highly uniform in-plane brightness distribution.

As described above, in the method for manufacturing a backlight according to the present invention, it is possible to achieve such advantages as (i) avoiding a cost increase caused by preparing a number of LEDs of the same rank and (ii) manufacturing a backlight having a sufficiently uniform in-plane brightness distribution.

Figure 5:
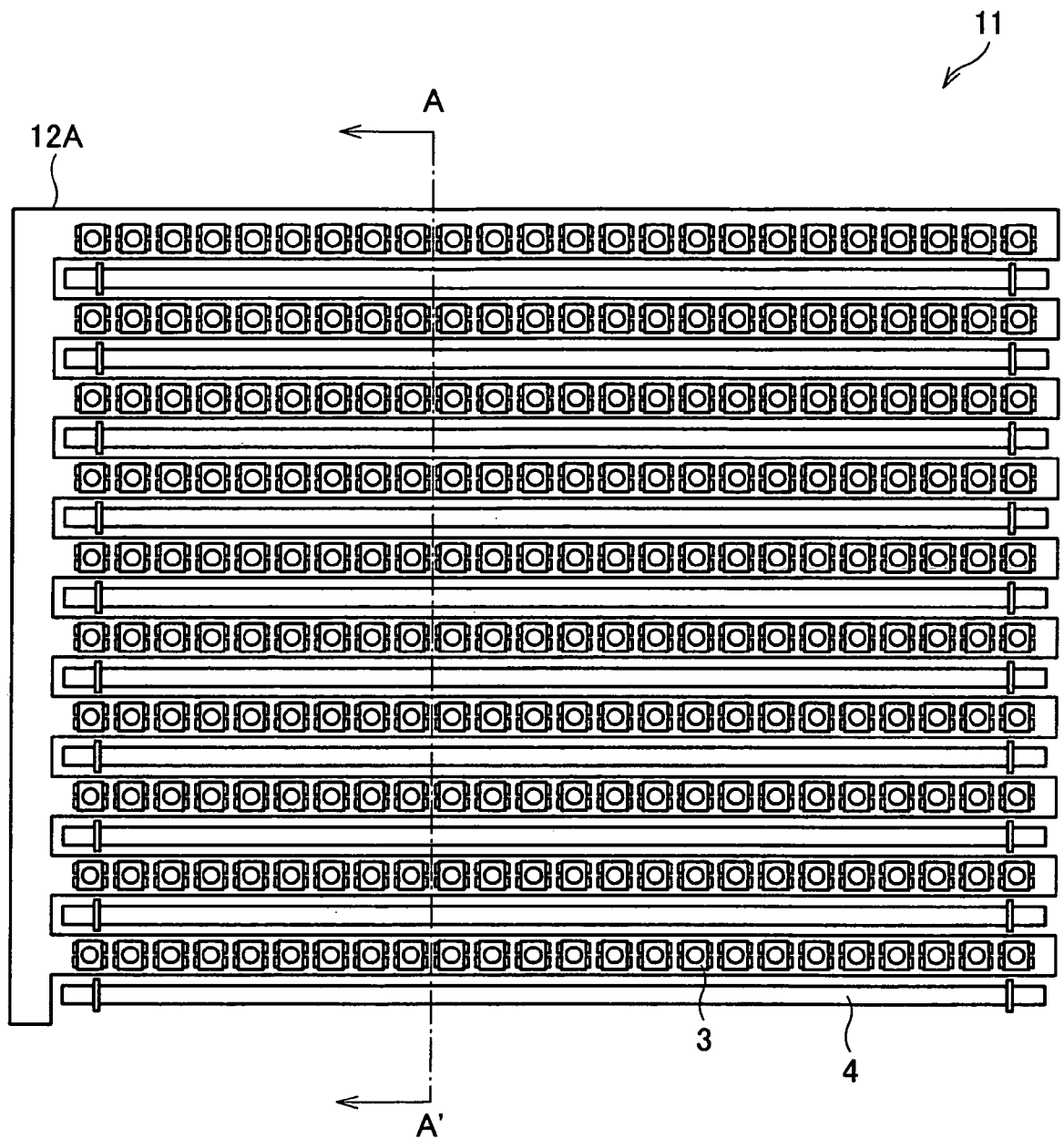
FIG. 5 is a plan view illustrating a structure of a backlight according to a second embodiment.
Figure 6:
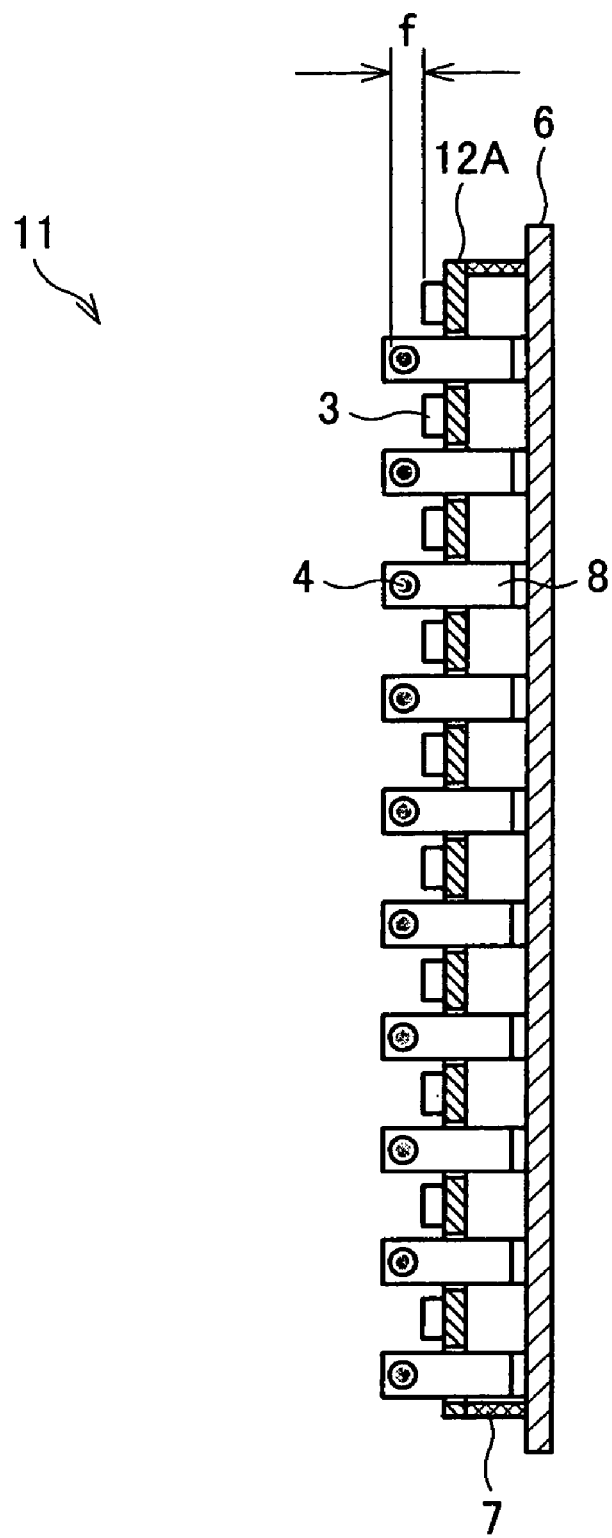
FIG. 6 is a cross-sectional view taken along line A-A' of FIG. 5 when viewed from a direction indicated by an arrow.

FIG. 5 is a plan view illustrating a structure of a backlight 11 of a second embodiment. FIG. 6 is a cross-sectional view taken along line A-A' of FIG. 5 when viewed from a direction indicated by an arrow. Note that, members being identical with those described in the comparative embodiment and the first embodiment are indicated by the same reference numerals.

The backlight 11 of the present embodiment includes a tooth-shaped substrate 12A, LEDs 3, CCFL devices 4, a cabinet 6, substrate attaching members 7, and CCFL device mounting members 8.

The following will describe constituting elements of the backlight 11. Since the LEDs 3 and the CCFL devices 4 were explained in the first embodiment, their explanations are omitted here. Further, the CCFL device mounting members 8 have the same structure as that of the CCFL device mounting members 28 described in the comparative embodiment, and their explanations are omitted.

The cabinet 6 is a flat-shaped member. The cabinet 6 serves to mount thereon the substrate attaching members 7 and the CCFL device mounting members 8 so as to maintain integration of those members.

The substrate attaching members 7 are interposed between the cabinet 6 and the substrate 12A positioned over the cabinet 6. The substrate attaching members 7 serve to attach the substrate 12A to the cabinet 6 with a predetermined distance therebetween.

In the substrate 12A, a part is cut out which includes an area corresponding to CCFL device mounting points e1 through e9 of the substrate 2 of the first embodiment (see FIG. 1). Further, the substrate 12A is formed so as to leave tooth portions on which the LED mounting points a1 through a240 are mounted.

On the tooth-shaped substrate 12A, 24 LEDs 3 are arranged in a linear manner so as to constitute each row. Over the entire substrate 12A, a total of 240 LEDs 3 constituting 10 rows are mounted, and the CCFL device mounting members 8 are provided in gaps between the tooth portions of the substrate 12A. Further, in upper portions of the CCFL device mounting members 8, the CCFL devices 4 are mounted.

On the substrate 12A, the LED mounting points a1 through a240 of the first embodiment are mounted. Further, LED mounting points b1 through b240 are mounted between rows on which the LED mounting points a1 through a240 are mounted. The substrate 12A is partially cut out so as to have a tooth shape. Specifically, the substrate 12A includes: (i) a part corresponding to an area on which the LED mounting points a1 through a240 are mounted in the substrate 2; and (ii) another part to be cut out which the LED mounting points b1 through b240 are mounted on. Note that, the LED mounting points b1 through b240 are configured to have 10 rows each having 24 LED mounting points such as b1 through b24.

The following will describe the structure of the backlight 11 of the present embodiment in more detail.

The backlight 11 of the present embodiment includes: the substrate attaching members 7 for attaching the substrate 12A to the cabinet 6; and the substrate 12A provided on the substrate attaching members 7. On the substrate 12A, a total of 240 LEDs 3 constituting 10 rows are mounted. On each of the rows, 24 LEDs 3 are arranged in a linear manner. Further, in the tooth-shaped part thus cut out from the substrate 12A, the CCFL device mounting members 8 are provided over the cabinet 6. Further, in upper portions of the CCFL device mounting members 8, CCFL devices 4 are mounted.

Referring to FIGS. 7 through 11, the following will describe a method for manufacturing the substrate 12A.

Figure 7:
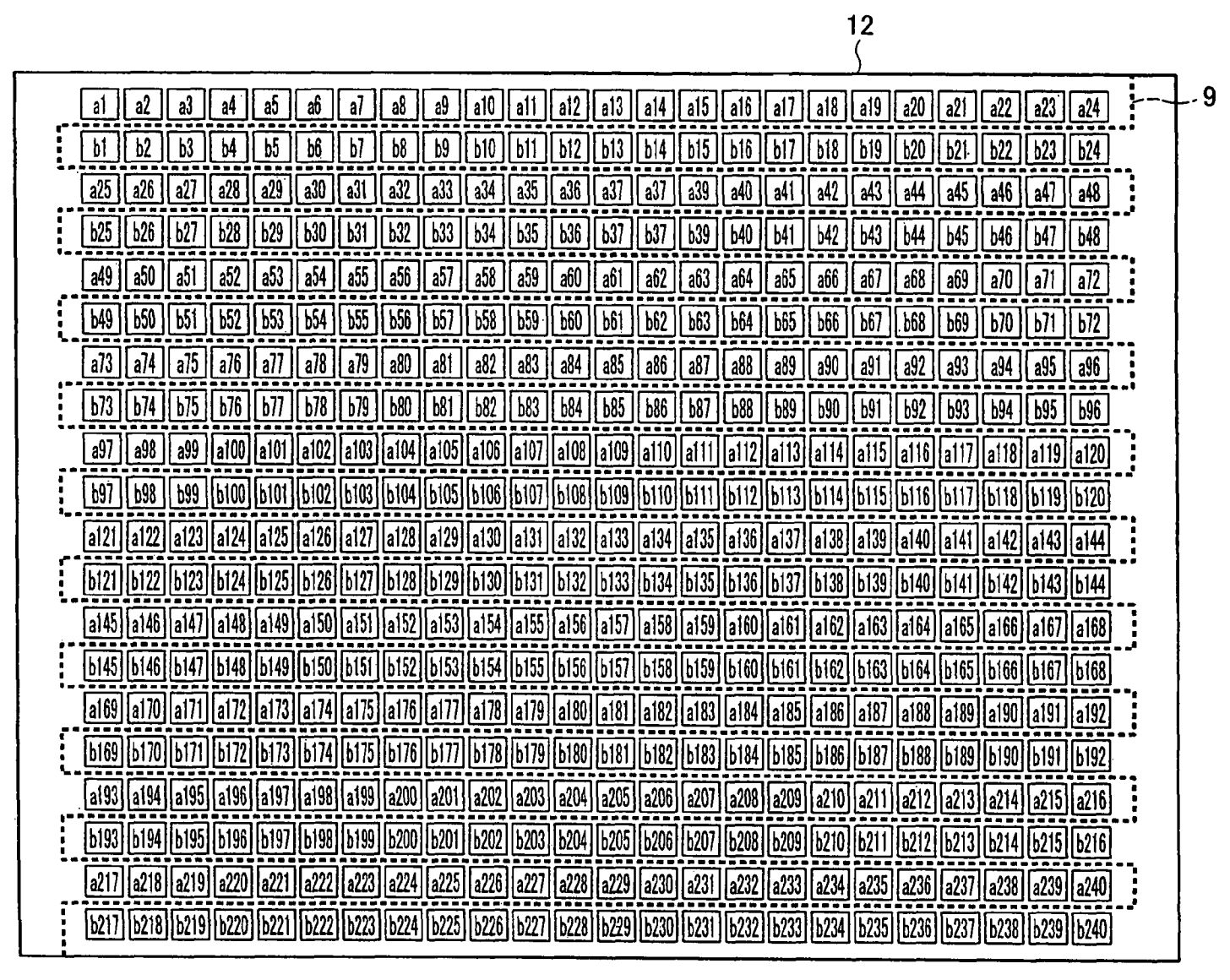

FIG. 7 is a view showing LED mounting points in a case where two tooth-shaped substrates 12A and 12B are prepared from the single substrate 12.

In FIG. 7, substrate dividing positions 9 are indicated in sections at which the substrate 12 is cut and divided into the tooth-shaped substrates 12A and 12B.

As shown in FIG. 7, the substrate 12 is cut along the substrate dividing positions 9, so as to be divided into the two tooth-shaped substrates 12A and 12B. Further, LED mounting points a1 through a240 are provided on the substrate 12A and LED mounting points b1 through b240 are provided on the substrate 12B, so that the both substrates 12A and 12B have LEDs 3 mounted thereon.

The LED mounting points a1 through a240 are configured to have 10 rows each having 24 LED mounting device points such as a1 through a24, arranged in a linear manner. Further, the LED mounting points b1 through b240 are configured to have 10 rows each having 24 LED mounting device points such as b1 through b24, arranged in a linear manner.

The rows of the LED mounting points a1 through a240 and the rows of the LED mounting points b1 through b24 are provided alternately. Further, as is the case with the first embodiment, the LED mounting points a1 through a240 are divided into 60 blocks in total, i.e., c1 through c60, each of which corresponds to a group constituted by four LED mounting points 3. For example, the block c1 corresponds to a group constituted by the LED mounting points a1, a2, a25, and a26. Further, the LED mounting points b1 through b240 are divided into 60 blocks in total, i.e., d1 through d60, each of which corresponds to a group constituted by four LED mounting points 3. For example, the block d1 corresponds to a group constituted by the LED mounting points b1, b2, b25, and b26.

Further, in the present embodiment, as is the case with the first embodiment, LEDs 3 of different brightness ranks are mounted on the substrates 12A and 12B so that a total brightness of four LEDs 3 in each of the blocks becomes substantially uniform over all of the blocks.

Further, before the substrate 12 is divided into the substrate 12A and 12B, the LEDs 3 are mounted on 480 LED mounting points on the substrate 12, i.e., the LED mounting points a1 through a240 and the LED mounting points b1 through b240. This enables the substrate 12 to have LEDs 3 mounted thereon more densely than the substrate 2 of the first embodiment.

Figure 8:
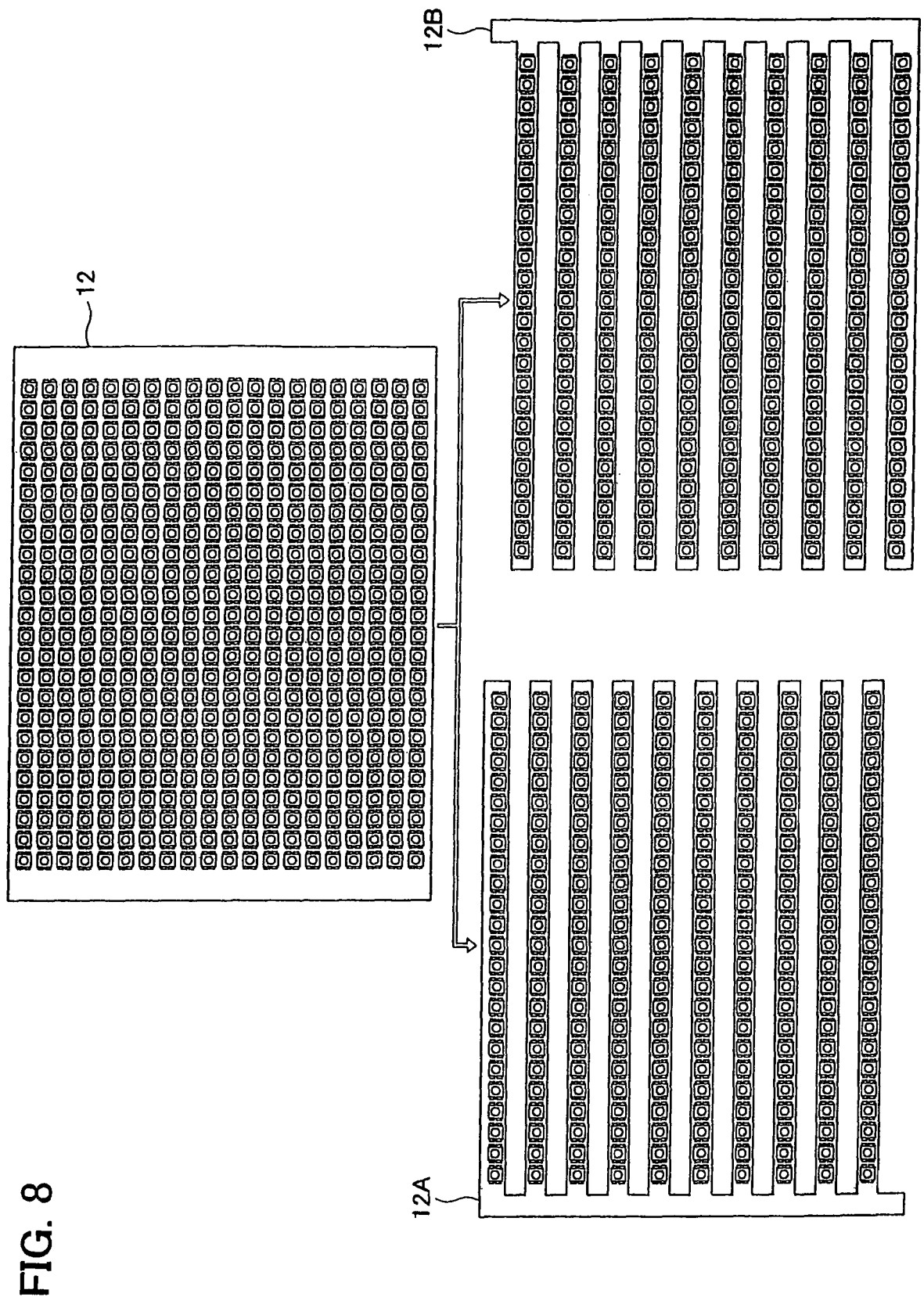
FIG. 8 shows plan views illustrating states of the substrate before and after a division process.
Figure 9:
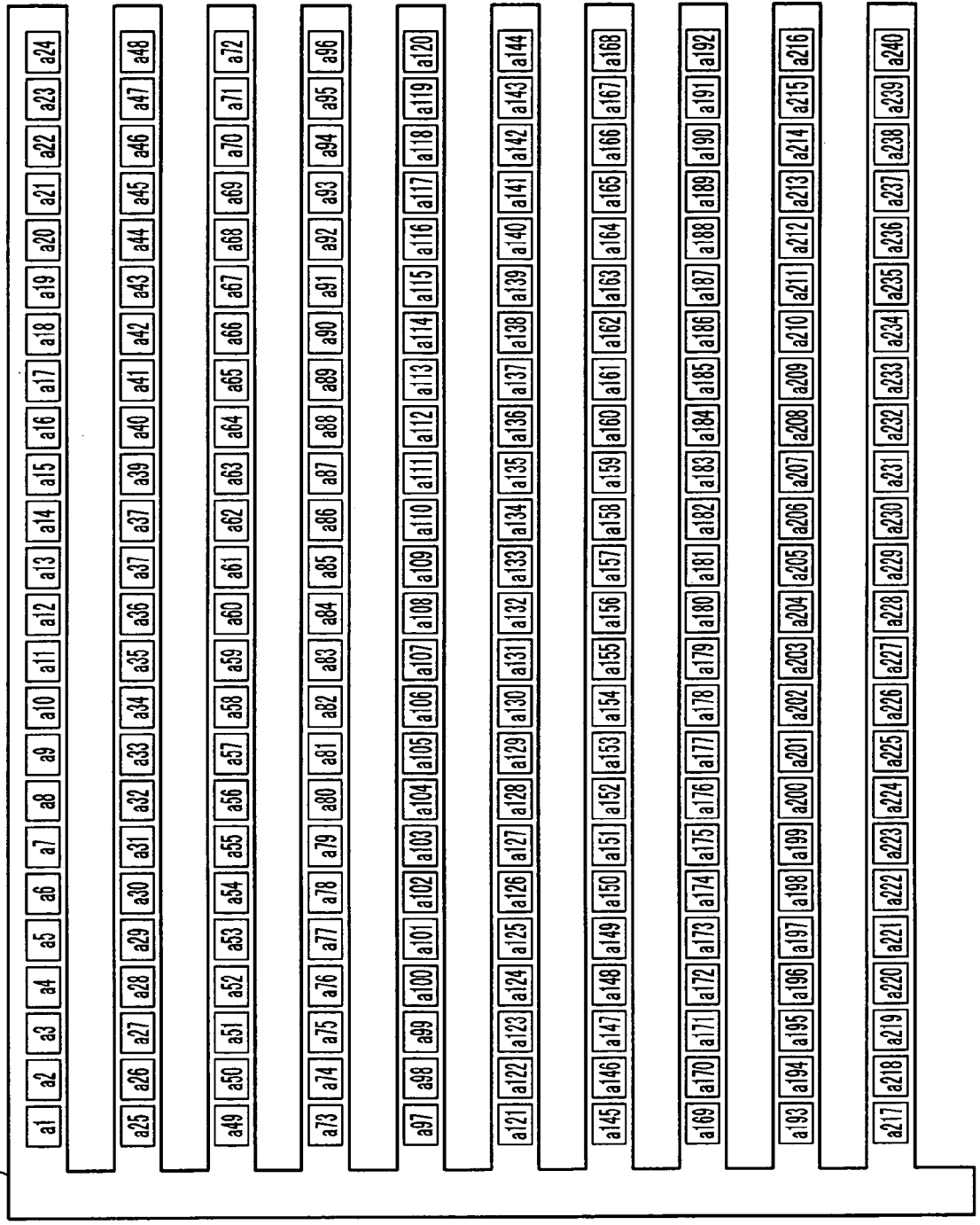
FIG. 9 is a plan view illustrating one of the substrate after the division process.
Figure 10:
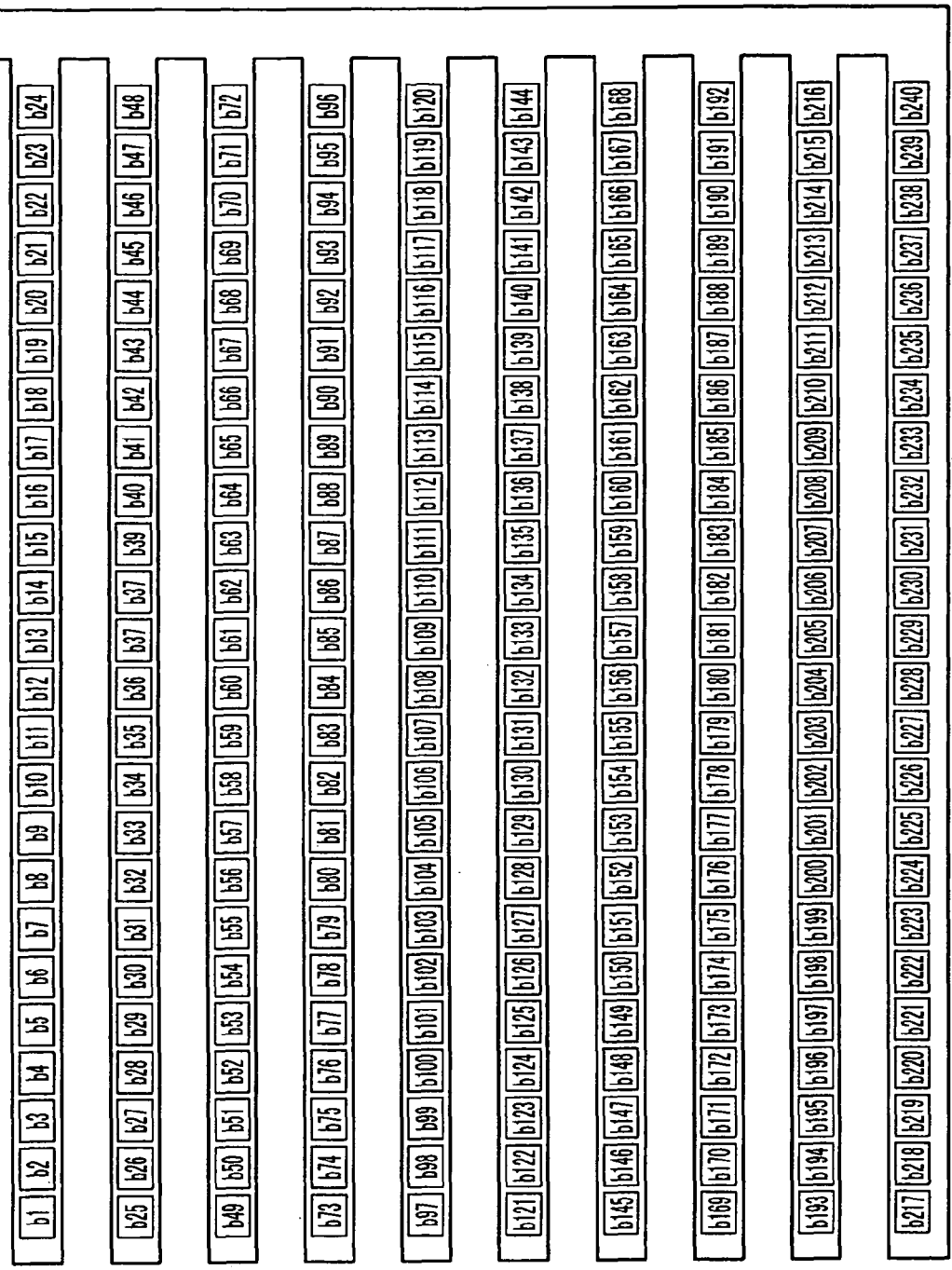
FIG. 10 is a plan view illustrating another one of the substrate after the division process.

Referring to FIGS. 8 through 10, the following will describe processes for cutting the substrate 12 into the two tooth-shaped substrates 12A and 12B in the case where LEDs 3 are densely mounted on the substrate 12.

FIGS. 8 through 10 show views illustrating processes of manufacturing the two tooth-shaped substrates 12A and 12B of the present embodiment. FIG. 8 shows plan views illustrating states of the substrate 12 before and after a division process. FIG. 9 is a plan view illustrating the substrate 12A after the division process, and FIG. 10 is a plan view illustrating the substrate 12B after the division process.

As shown in FIG. 8, the substrate 12 having the LEDs 3 mounted thereon are cut along the substrate dividing positions 9, so as to be divided into the two tooth-shaped substrates 12A and 12B.

Note that, in order to simplify LED mounting points on the substrates 12A and 12B, FIGS. 9 and 10 show the state of the substrates 12A and 12B before the LEDs 3 are mounted.

Using the manufacturing method as shown in FIGS. 8 through 10, it is possible to use the substrate 12 serving as the two substrates 12A and 12B, which have conventionally served as a single substrate constituting a backlight, while realizing cost reduction. This allows use of the substrate 12B having an identical structure with that of the substrate 12A.

In the backlight 21 shown in FIG. 14, LEDs 23 and CCFL devices 24 are both mounted on and over the substrate 22. This causes a large distance g between (i) the LEDs 23 mounted on the substrate 22 and (ii) the CCFL devices 24 mounted over the substrate 22 via the CCFL device mounting members 28, failing to suppress an increase in thickness of the backlight 21 of the comparative embodiment. Further, providing the diffusion sheet 25 and the LCD panel 26 in the upper portions of the backlight 21 causes a significant distance between the LEDs 23 and LCD panel 26. This reduces an efficiency of using the light from the LEDs 23, requiring a larger number of LEDs 23.

On the contrary, in the backlight 11 of the present embodiment, as seen from its cross section shown in FIG. 6, the CCFL device mounting members 8 can be disposed directly on the cabinet 6, specifically in the part thus cut out from the tooth-shaped substrate 12A. This allows the LEDs 3 to be mounted on the substrate 12A, and the CCFL devices 4 to be mounted over the cabinet 6 via the CCFL device mounting members 6. It is therefore possible for the backlight 22 of the present embodiment to have a reduced distance f between a light emitting surface of the LEDs 3 and the CCFL devices 4. This realizes a reduction in thickness of the backlight 1. Since the reduction in thickness of the backlight 1 allows the backlight 1 to be disposed close to an LCD panel, a brightness on the LCD panel can be maintained with the small number of LEDs 3.

Further, in the method for manufacturing a backlight according to the present embodiment, the LEDs 3 are densely mounted on the substrate 12 beforehand. This facilitates the mounting operations efficiently.

Note that, in the present embodiment, the substrates 12A and 12B are prepared from the single substrate 12. The foregoing described a case for convenience where the substrate 12A and 12B are formed to have a tooth shape. However, the shape of the substrates 12A and 12B is not limited to this example. The substrates 12A and 12B may be formed in any shape that allows the CCFL devices 4 to be mounted on the cabinet 6. For example, the substrates 12A and 12B may be formed such that a plurality of parts having the same shape as CCFL devices 4 are cut out from the substrate 12.

Figure 11:
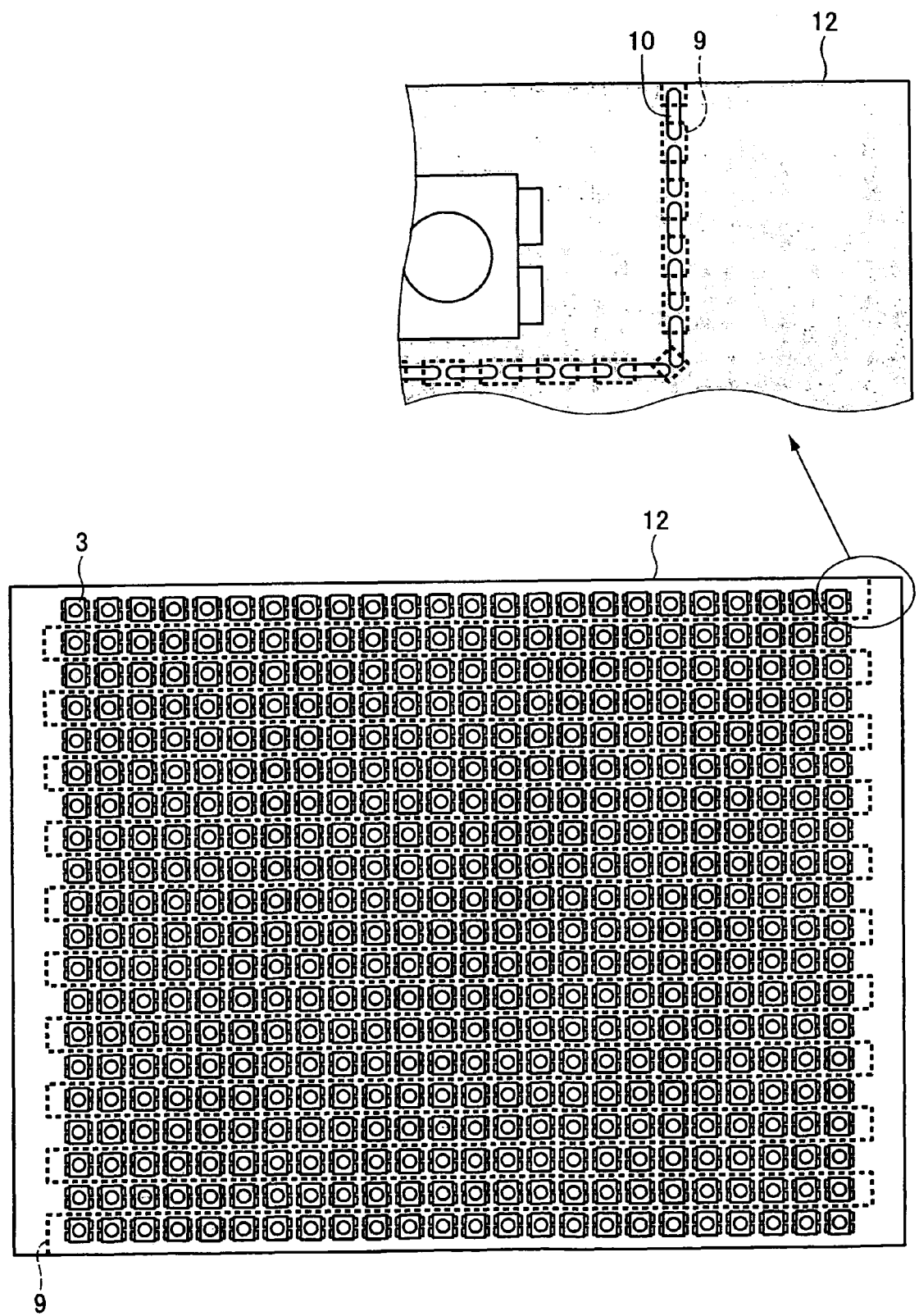
FIG. 11 shows views illustrating the substrate 12 on which snicked sections 10 are provided along the substrate dividing positions 9.

FIG. 11 shows views illustrating the substrate 12 on which snicked sections 10 are provided along the substrate dividing positions 9.

As described above, after the LEDs 3 are mounted, the substrate 12 is divided into the two tooth-shaped substrates 12A and 12B.

This means that the cutting operation needs to be performed on the substrate 12 on which the LEDs 3 are densely mounted, and requires a sophisticated technique for cutting the substrate to have a tooth shape with high accuracy. For this purpose, the snicked sections 10 are provided beforehand on the substrate 12 along the substrate dividing positions 9. Further, each of the snicked sections 10 is made to be large enough to receive a tip of a nipper. With the snicked sections 10 thus provided, the substrate 12 can be easily cut using a nipper or the like after the LEDs 3 are mounted. This realizes efficient manufacturing.

In the present embodiment, the foregoing described the method of cutting the substrate 12 from its edge portion using a nipper or the like. However, the present invention is not limited to this example, and the substrate 12 may be cut such that its part(s) are punched out using a metal template or the like.

As described above, the backlight 11 may further include a plurality of the CCFL devices 4 that are mutually arranged in parallel. In the backlight 11, a plurality of the LEDs 3 may be mounted on tooth-shaped substrates and the CCFL devices 4 may be mounted in gaps between tooth portions of the tooth-shaped substrates 12A and 12B.

According to the method, the CCFL devices 4 are mounted in the gaps between the tooth portions of the tooth-shaped substrates 12A and 12B, not on the tooth-shaped substrates 12A and 12B. Since the CCFL devices 4 are disposed close to the light emitting surface of the LEDs 3 mounted on the tooth-shaped substrates 12A and 12B, the backlight 11 can have a reduced thickness. This allows an object illuminated by light from the backlight 11 to be disposed close to a light source, thereby improving the efficiency of using light from the LEDs 3 and CCFL devices 4.

Further, according to the method for manufacturing a backlight of the present invention, the tooth-shaped substrate may be prepared by dividing a single substrate into two parts each having a tooth shape.

According to the method, it is possible to prepare two tooth-shaped substrates from a single substrate, realizing cost reduction.

Further, the substrate used as a single substrate constituting a backlight serves as two substrates. This also realizes cost reduction.

Further, according to the method for manufacturing a backlight of the present invention, the backlight may further include a plurality of linear light emitting devices which are mutually arranged in parallel, the dot light emitting devices may be mounted on a substrate from which a part having a same shape as the linear light emitting devices is cut out, and the linear light emitting devices may be provided in the part thus cut out.

According to the method, the dot light emitting devices are mounted on a substrate from which a part having the same shape as the linear light emitting devices is cut out. Further, the linear light emitting devices are provided in the part thus cut out from the substrate.

The linear light emitting devices are constituted by thin glass tubes and may be broken due to vibration, which occurs when the linear light emitting devices are mounted directly on a substrate. Considering this, the linear light emitting devices are mounted with a predetermined distance from the substrate.

This creates, when the dot light emitting devices and the linear light emitting devices are mounted on the substrate, a large distance between the surfaces of the respective light emitting devices.

Thus, the backlight of the present invention is arranged such that only the dot light emitting devices are mounted on the substrate.

This causes the light emitting surface of the linear light emitting devices to be close to the light emitting surface of the dot light emitting devices, thereby realizing a reduction in thickness of the backlight. As a result, an object illuminated by light from the backlight can be disposed close to a light source. This enhances the efficiency of using light from the dot light emitting devices and the linear light emitting devices.

Further, according to the method for manufacturing a backlight of the present invention, the substrate may be prepared by dividing a single substrate into two parts each having a tooth shape.

According to the method, it is possible to prepare two tooth-shaped substrates from the single substrate, realizing cost reduction.

Further, according to the method for manufacturing a backlight of the present invention, the substrate may have: a snicked section along a dividing section for dividing the substrate; and a connecting section for maintaining integration of the substrate.

According to the method, with the snicked section thus provided on the substrate, it is possible to easily cut the substrate along the shape of the tooth portions using a nipper, a metal template, or the like. Thus, even after the dot light emitting devices are densely mounted on the substrate, the substrate can be easily cut. This realizes efficient manufacturing.

According to the present invention, it is possible to suppress variations in brightness both (i) in a substrate constituting a backlight and (ii) among substrates. This realizes manufacturing of a backlight having a uniform in-plane distribution. Thus, the present invention is preferably applied to a backlight, which is employed as a light source for displaying an image on an LCD panel such as a liquid crystal television, a liquid crystal display, or a liquid crystal monitor, and which employs CCFL devices and LEDs in combination.

The embodiments and concrete examples of implementation discussed in the foregoing detailed explanation of the invention serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method for manufacturing a backlight comprising dot light emitting devices arranged in a first plane manner, the method comprising:
   preparing a plurality of dot light emitting devices of substantially similar color having at least two different brightness ranks into which the dot light emitting devices are classified in accordance with brightness, wherein each brightness rank comprises a predetermined range of brightness variations, and
   mounting the plurality of dot light emitting devices in a plurality of blocks, each block comprising at least two dot light emitting devices of different brightness ranks, so that the number of the dot light emitting devices provided in each of the plurality of blocks is substantially uniform across the plurality of blocks and a total brightness associated with the brightness ranks of the dot light emitting devices provided in each of the plurality of blocks provides a substantially uniform brightness distribution cross the plurality of blocks.

2. The method according to claim 1, further comprising:
   mutually arranging a plurality of linear light emitting devices in parallel,
   cutting out a part of the substrate corresponding to the plurality of dot light emitting devices arranged in parallel, said part having a same shape as the plurality of linear light emitting devices arranged in parallel; and
   providing the linear light emitting devices in the part thus cut out.

3. The method according to claim 2, further comprising:
   preparing the substrate by dividing a single substrate into two parts, each having a tooth shape.

4. The method of claim 1, further comprising:
   making a snicked section along a dividing section configured to divide the substrate; and
   making a connecting section configured to maintain integration of the substrate.

5. A method for manufacturing a backlight comprising dot light emitting devices arranged in a plane manner, the method comprising:
   preparing a plurality of dot light mounting devices of substantially similar color having at least two different brightness ranks into which the dot light emitting devices are classified in accordance with brightness, each of said at least two different brightness ranks having a known center value of brightness; and
   mounting the plurality of dot light emitting devices in a plurality of blocks, each block comprising at least two dot light emitting devices of different brightness ranks, so that the number of the dot light emitting devices provided in each of the plurality of blocks is substantially uniform across the plurality of blocks and a total of center values of the brightness ranks of the dot light emitting devices in each of the plurality of blocks is substantially uniform across the plurality of blocks.

6. The method according to claim 5, further comprising:
   mutually arranging in parallel a plurality of linear light emitting devices;
   mounting the dot light emitting devices on a substrate;
   cutting out from the substrate a part having a same shape as the plurality of linear light emitting devices arranged in parallel;
   providing the linear light emitting devices in the part thus cut out.

7. The method according to claim 6, further comprising:
   preparing the substrate by dividing a single substrate into two parts each having a tooth shape.

8. The method according to claim 6, further comprising:
   causing the substrate to have a snicked section along a dividing section configured so as to divide the substrate; and
   causing the substrate to have a connecting section configured so as to maintain integration of the substrate.

9. The method for manufacturing a backlight of claim 5, wherein a total of the center values in each of the blocks varies within the range of plus (+) 15 percent to minus (−) 15 percent.

10. A method for manufacturing a backlight comprising dot light emitting devices arranged in a first plane manner, the method comprising:
    preparing a plurality of dot light emitting devices of substantially identical structure having a least two different brightness ranks into which the dot light emitting devices are classified in accordance with brightness; and
    mounting the plurality of dot light emitting devices in a plurality of blocks, each block comprising at least two dot light emitting devices of different brightness ranks, so that the number of the dot light emitting devices provided in each of the plurality of blocks is substantially uniform across the plurality of blocks and a total brightness associated with the brightness ranks of the dot light emitting devices provided in each of the plurality of blocks provides a substantially uniform brightness distribution cross the plurality of blocks.

11. A method for manufacturing a backlight comprising dot light emitting devices arranged in a plane manner, the method comprising:

preparing a plurality of dot light mounting devices of substantially identical structure having at least two different brightness ranks into which the dot light emitting devices are classified in accordance with brightness, each of said at least two different brightness ranks having a known center value of brightness; and mounting the plurality of dot light emitting devices in a plurality of blocks, each block comprising at least two dot light emitting devices of different brightness ranks, so that the number of the dot light emitting devices provided in each of the plurality of blocks is substantially uniform across the plurality of blocks and a total of center values of the brightness ranks of the dot light emitting devices in each of the plurality of blocks is substantially uniform across the plurality of blocks.

\* \* \* \* \*